(12) United States Patent
Allen, Jr. et al.

(10) Patent No.: US 9,374,334 B2
(45) Date of Patent: *Jun. 21, 2016

(54) PROGRAMMATIC MESSAGE PARTNER LIST MANAGEMENT

(71) Applicant: International Business Machines Corporation, Armonk, NY (US)

(72) Inventors: Lloyd W. Allen, Jr., Cary, NC (US); Steve R. Campbell, Lillington, NC (US); Jana H. Jenkins, Raleigh, NC (US); Tricia E. York, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/941,440

(22) Filed: Jul. 12, 2013

(65) Prior Publication Data

US 2013/0304837 A1    Nov. 14, 2013

Related U.S. Application Data

(62) Division of application No. 11/204,465, filed on Aug. 16, 2005, now Pat. No. 8,516,056.

(51) Int. Cl.
*G06F 15/16* (2006.01)
*H04L 12/58* (2006.01)
*H04L 12/18* (2006.01)

(52) U.S. Cl.
CPC ............ *H04L 51/36* (2013.01); *H04L 12/1831* (2013.01); *H04L 12/581* (2013.01); *H04L 51/04* (2013.01)

(58) Field of Classification Search
CPC .... H01L 12/581–12/582; H01L 51/00–51/046
See application file for complete search history.

(56) References Cited

U.S. PATENT DOCUMENTS

| | | | |
|---|---|---|---|
| 6,366,962 B1 * | 4/2002 | Teibel | 709/245 |
| 2003/0065721 A1 | 4/2003 | Roskind | |
| 2003/0093483 A1 | 5/2003 | Allen et al. | |
| 2003/0154248 A1 | 8/2003 | Smith et al. | |
| 2003/0154249 A1 | 8/2003 | Crockett et al. | |
| 2004/0059781 A1 | 3/2004 | Yoakum et al. | |
| 2005/0071435 A1 | 3/2005 | Karstens | |
| 2005/0239498 A1 * | 10/2005 | Dorenbosch et al. | 455/552.1 |
| 2006/0009249 A1 * | 1/2006 | Fu et al. | 455/518 |
| 2006/0215690 A1 * | 9/2006 | Wilson et al. | 370/465 |
| 2007/0067439 A1 * | 3/2007 | Mason et al. | 709/224 |

* cited by examiner

*Primary Examiner* — Brendan Higa
(74) *Attorney, Agent, or Firm* — Steven M. Greenberg, Esq.; CRGO Law

(57) ABSTRACT

Embodiments of the present invention address deficiencies of the art in respect to instant messaging and real-time communications systems and provide a method, system and computer program product for automated partner list management in a real-time communications system. In one embodiment, a real-time communications data processing system can include a real-time communications server, a history log configured to record user interaction records for different users of the real-time communications server, a set of partner lists for the different users, and partner list management logic coupled to each of the real-time communications server and history log. The partner list management logic can include program code enabled to remove individual ones of the different users from a single one of the partner lists which individual ones of the different users meet at least one configurable criteria.

6 Claims, 2 Drawing Sheets

PROGRAMMATIC MESSAGE PARTNER LIST MANAGEMENT

CROSS-REFERENCE TO RELATED APPLICATION

This application is a Divisional Application of U.S. application Ser. No. 11/204,465, filed on Aug. 16, 2005, now U.S. Pat. No. 8,516,056, entitled "PROGRAMMATIC MESSAGE PARTNER LIST MANAGEMENT", the entirety of which is incorporated herein by reference.

BACKGROUND OF THE INVENTION

1. Field of the Invention

The present invention relates to the field of real-time communications and more particularly to the management of partner lists in a real-time communications system.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In an impatient society, even the minor latencies associated with electronic mail often cannot be tolerated. More importantly, often the feel and nature of a "conversation" as it is known to human beings only can be approximated through real time communications where the participants to a conversation have little time to assess a response to any portion of a message, much as is the case in a live, face-to-face conversation. Hence, the use of real time communications systems, like instant chat, instant messaging, text messaging, audio messaging, video messaging and picture sharing have begun to penetrate the communications marketplace.

Partner lists, also known as "buddy lists" have become an integral part of the real-time communications client. Typically, partner lists include a set of partners with whom one frequently communicates using real-time communications. When one activates a name in the partner list through the real-time communications system, a messaging session can be established with the user associated with the activated name. To facilitate the organization of a partner list with many listed partners, groupings of partners can be established so as to create a hierarchy of partners in the partner list. Of course, nothing prevents a name from appearing within multiple groups in the same partner list. Hence, managing the partner list can become a more substantial exercise as the number of partners and groups grows.

The names in a partner list are not live. Specifically, the presence of a name in a partner list is not dependent on the validity of the user associated with the name. To that end, even though a user associated with a name in a partner list can be removed from the real-time communications system, the name will remain in the partner list until the owner of the partner list discovers the broken link and removes the name from the partner list. Likewise, when a user associated with a name no longer can be considered a frequent messaging partner, it remains incumbent upon the owner of the partner list to prune the list to include only names associated with relevant messaging partners.

To address the challenge of maintaining a partner list, several programmatic tools have been suggested. For example, a buddy list management tool is described in United States Patent Publication US 2003/0065721 by Roskind for PASSIVE PERSONALIZATION OF BUDDY LISTS published on Apr. 3, 2003 based upon a filing date of Apr. 30, 2002 claiming priority to the provisional patent application having Ser. No. 60/325,084 filed on Sep. 28, 2001.

In the Roskind publication, the names in a buddy list can be managed according to the frequency of contact between the owner of the buddy list and the user associated with the name. Notwithstanding, the management of the buddy list in Roskind remains limited to knowledge produced for each individual buddy list in the instant messaging system. System-wide knowledge is wholly ignored and therefore, Roskind fails to capitalize on the efficiencies afforded by such knowledge.

BRIEF SUMMARY OF THE INVENTION

Embodiments of the present invention address deficiencies of the art in respect to instant messaging and real-time communications systems and provide a novel and non-obvious method, system and computer program product for automated partner list management in a real-time communications system. In one embodiment, a real-time communications data processing system can include a real-time communications server, a history log configured to record user interaction records for different users of the real-time communications server, a set of partner lists for the different users, and partner list management logic coupled to each of the real-time communications server and history log.

The partner list management logic can include program code enabled to remove individual ones of the different users from a single one of the partner lists which individual ones of the different users meet at least one configurable criteria. For instance, the program code for the partner list management logic can be enabled to identify individual ones of the different users who have not logged into the real-time communications server in a threshold period of time, match the identified individual ones of the different users with users in a single one of the partner lists, and selectably remove matching ones of the identified individual ones of the different users from the single one of the partner lists.

In another embodiment, a computer implemented method for managing partner lists in a real-time communications system can be provided. The method can include configuring criteria for selecting a subset of users in the real-time communications system, selecting a subset of users in the real-time communications system according to the configured criteria, matching users in the subset with users in a partner list for one of the users of the real-time communications system, and selectably removing matched ones of the users from the partner list. Optionally, the method can include removing duplicate entries for one of the users from different groups in the partner list.

Configuring criteria for selecting a subset of users in the real-time communications system can include selecting a threshold lapsed period of time, for example. Consequently, selecting a subset of users in the real-time communications system according to the configured criteria can include selecting a subset of users in the real-time communications system who have not logged into the real-time communications system in the threshold lapsed period of time. Likewise, selecting a subset of users in the real-time communications system according to the configured criteria can include selecting a subset of users in the real-time communications system who have not transmitted a message through the real-time communications system in the threshold lapsed period of time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing a partner list in a real-time communications system. In accordance with an embodiment of the present invention, partner participation in the real-time communications system can be recorded in a log. The log can be reviewed from time to time, either manually or automatically, to identify when different communications partners last interacted with the real-time communications system. A threshold period of elapsed time can be compared to the log to produce a listing of partners who have not recently interacted with the real-time communications system.

Subsequently, individual partner lists for different users of the real-time communications system can be prompted to remove partners in the individual partner lists based upon the listing of partners who have not recently interacted with the real-time communications system. In this way, the system-wide knowledge of the real-time communications system can be leveraged by the individual users in managing their respective partner lists and the individual users need not individually maintain an awareness of partner interactions in the real-time communications system.

Figure 1:
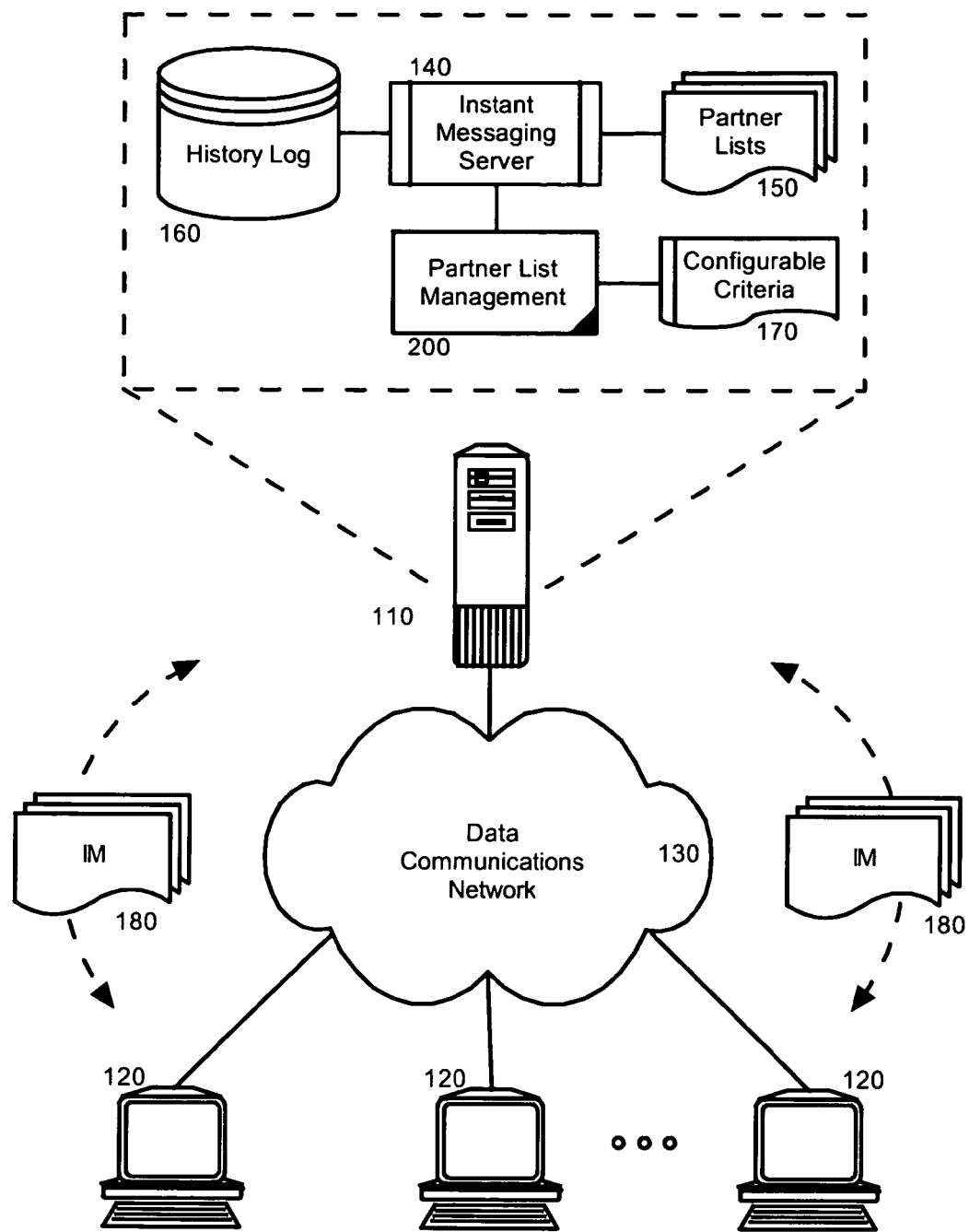
FIG. 1 is a schematic illustration of a real-time communications system configured for automated partner list management; and, FIG. 2 is a flow chart illustrating a process for automated partner list management in a real-time communications system.

In more particular illustration, FIG. 1 is a schematic illustration of a real-time communications system configured for partner list management. As shown in FIG. 1, the real-time communications system can be an instant messaging system which can include an instant messaging server 110 communicatively coupled to one or more instant messaging clients 120 over a data communications network 130. The instant messaging server 110 can include instant messaging server logic 140 programmed to moderate the exchange of instant messages 180 between the instant messaging clients 120 over the data communications network 130.

Notably, a history log 160 can be coupled to the instant messaging server 140. The history log 160 can record the activity of users in the instant messaging system, including when each of the users last logged into the instant messaging server 140, and when each of the users last transmitted or received an instant message in the instant messaging system. Also, a set of partner lists 150, each for a different user, can be coupled to the instant messaging server 140. Each of the partner lists 150 can be maintained by a corresponding user to facilitate the quick messaging of other users named in a corresponding one of the partner lists 150.

Importantly, partner list management logic 200 can be coupled to the instant messaging server 140. The partner list management logic 200 can include program code enabled to analyze the data in the history log 160 to identify users meeting a particular configurable criteria 170, for example, users who have not interacted with the instant messaging system in a threshold period of time. The configurable criteria 170 can be determined programmatically, statically or through a prompting of an end user. The partner list management logic 200 further can include program code enabled to compare a set of users meeting the configurable criteria 170 with a list of users in a single one of the partner lists 150.

Finally, the partner list management logic 200 can include program code enabled to remove selected ones of the users from a single one of the partner lists 150, who are both known to have met the configurable criteria 170, and also who appear in a list of users in the single one of the partner lists 150. In this regard, the program code of the partner list management logic 200 can be enabled to provide a wizard style user interface or dialog box to facilitate an end user selection of the users. Optionally, the partner list management logic 200 can include program code enabled to identify duplicate entries of the same user in different groups in a single one of the partner lists 150 and to permit an end user to remove the duplicate entries.

Figure 2:
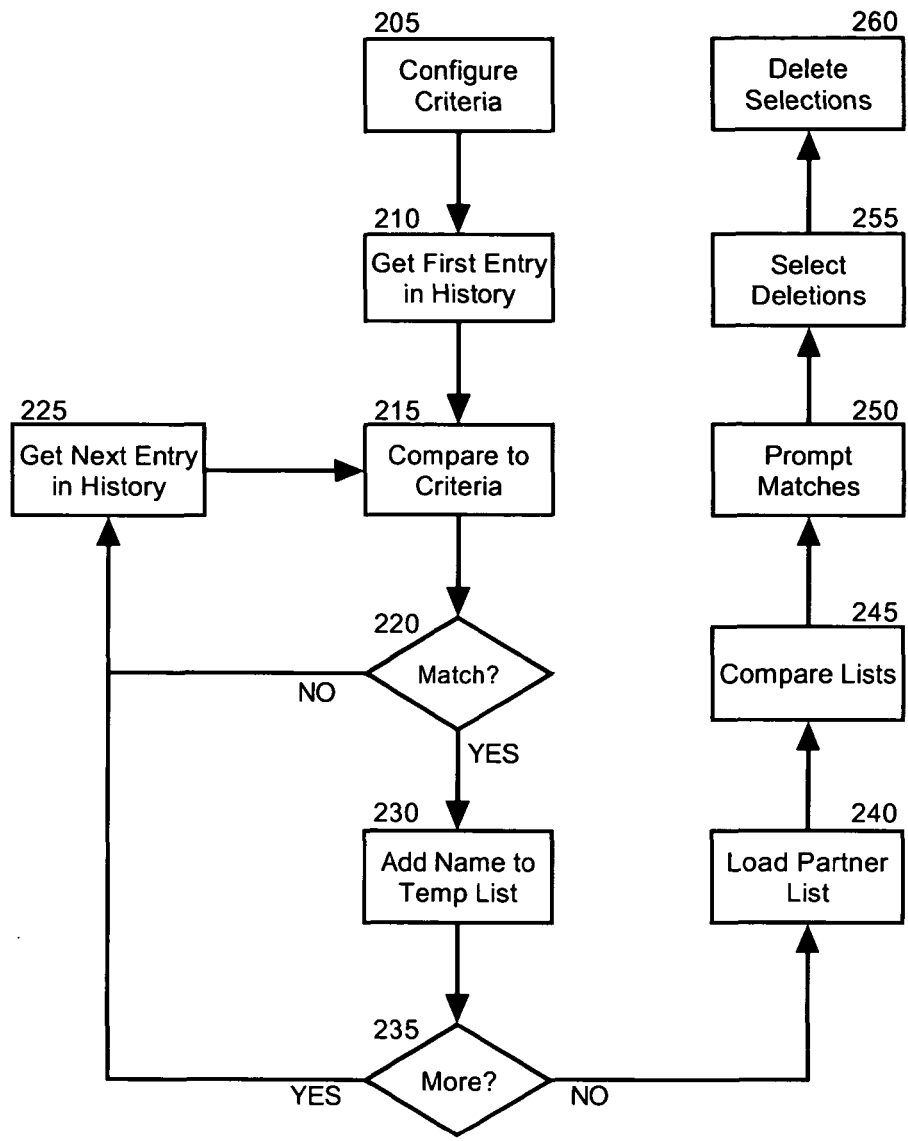

In further illustration of the operation of the partner list management logic 200, FIG. 2 is a flow chart illustrating a process for automated partner list management in a real-time communications system. Beginning in block 205, criteria can be configured such as a threshold elapsed time since a partner has logged into the real-time communications system, or a threshold elapsed time since a partner has sent a message to another user in the real-time communications system. In block 210, a first entry in the history log can be retrieved for processing. Subsequently, in block 215, the entry can be compared to the configured criteria.

In decision block 220, if a match occurs between the configured criteria and the content of the retrieved entry from the history log, in block 230 the user associated with the first entry can be added to a temporary list. In decision block 235, if additional entries in the history log remain to be processed, the process can repeat in block 225 where a next entry can be retrieved and processed through blocks 215 through 235. When no additional entries remain to be processed in the history log in decision block 235, the process can continue through block 240.

In block 240, a partner list can be loaded for an individual user of the real-time communications system. In block 245, the entries in the partner list can be compared to the entries in the temporary list. Matching entries can be automatically removed from the partner list, or in block 250 the matching entries can be presented for consideration by an end user associated with the partner list. In this regard, in block 255 individual ones of the matching entries can be selected for removal from the partner list and in block 260 the selected entries can be removed from the partner list.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer program product comprising a non-transitory computer usable storage medium having computer usable program code for managing partner lists in a real-time communications system comprising a hardware server having a hardware processor, said computer program product including:
   computer usable program code for programmatically managing, by the hardware processor, said partner lists of a user in the real-time communications system relieving the user from needing to maintain an awareness of partner interactions in the real-time communication system, the computer usable program code comprising:
   computer usable program code for programmatically selecting a threshold lapsed period of time;
   computer usable program code for programmatically configuring, by the hardware processor, criteria for selecting a subset of users in the real-time communications system who are determined to have not logged into the real-time communications system for the programmatically selected threshold lapsed period of time;
   computer usable program code for selecting, by the hardware processor, a subset of users in the real-time communications system according to said configured criteria of having not logged into the real-time communications system for the programmatically selected threshold lapsed period of time, by retrieving a multiplicity of entries in a history log recording activity of users in the real-time communications system, comparing each retrieved entry in the history log to the configured criteria to determine whether there is a match with the configured criteria, and adding a user associated with a corresponding one of the retrieved entries to the subset of users upon determining a match between the content of the corresponding one of the retrieved entries and the configured criteria;
   computer usable program code for matching, by the hardware processor, users in said subset of users with users in a partner list for one of said users of the real-time communications system; and,
   computer usable program code for selectably removing, by the hardware processor, matched ones of said users from said partner list.

2. The computer program product of claim 1, wherein said computer usable program code for selecting, by the hardware processor, the subset of users in the real-time communications system according to said configured criteria, additionally comprises computer usable program code for selecting, by the hardware processor, the subset of users in the real-time communications system who have not transmitted a message through the real-time communications system in said threshold lapsed period of time.

3. The computer program product of claim 1, further comprising computer usable program code for removing, by the hardware processor, duplicate entries for one of said users from different groups in said partner list.

4. The computer program product of claim 3, wherein the computer usable program code for removing, by the hardware processor, duplicate entries for one of said users from different groups in said partner list comprises:
   computer usable program code for prompting the user via a user interface as to whether the duplicate entries for the one of said users from different groups in said partner list; and,
   computer usable program code for removing, by the hardware processor, the duplicate entries for the one of said users from different groups in said partner list upon receiving a selection from the user to remove the duplicate entries.

5. The computer program product of claim 1, where the real-time communications system is an instant messaging system.

6. The computer program product of claim 1, wherein the computer usable program code for selectably removing, by the hardware processor, matched ones of said users from said partner list comprises:
   computer usable program code for transforming, by the hardware processor, the matched ones of said users from said partner list into a visual display for presentation to the user associated with said partner list in a user interface;
   computer usable program code for receiving, by the hardware processor, a selection of the matched ones of said users from said partner list from the user associated with said partner list to be removed; and,
   computer usable program code for removing, by the hardware processor, the matched ones of said users from said partner list corresponding to the selection of the matched ones of said users from said partner list from the user associated with the partner list.

* * * * *